United States Patent
Zebiak et al.

(10) Patent No.: US 11,052,896 B2
(45) Date of Patent: Jul. 6, 2021

(54) PREDICTIVE GRADE OPTIMIZATION IN CRUISE CONTROL

(71) Applicant: GM GLOBAL TECHNOLOGY OPERATIONS LLC, Detroit, MI (US)

(72) Inventors: Matthew S. Zebiak, Ann Arbor, MI (US); Amanpal S. Grewal, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 16/444,628

(22) Filed: Jun. 18, 2019

(65) Prior Publication Data
US 2020/0398810 A1    Dec. 24, 2020

(51) Int. Cl.
*B60W 10/06*    (2006.01)

(52) U.S. Cl.
CPC ......... *B60W 10/06* (2013.01); *B60W 2520/10* (2013.01); *B60W 2552/15* (2020.02); *B60W 2552/20* (2020.02); *B60W 2556/50* (2020.02)

(58) Field of Classification Search
None
See application file for complete search history.

(56) References Cited

U.S. PATENT DOCUMENTS

| | | | |
|---|---|---|---|
| 6,374,173 B1 | 4/2002 | Ehlbeck | |
| 6,990,401 B2 | 1/2006 | Neiss et al. | |
| 2011/0276216 A1 | 11/2011 | Vaughan | |
| 2011/0313647 A1* | 12/2011 | Koebler | B60T 7/22 701/123 |
| 2017/0291605 A1* | 10/2017 | Grewal | B60W 30/143 |
| 2018/0134295 A1* | 5/2018 | Gaither | B60W 50/06 |
| 2019/0161082 A1* | 5/2019 | Fairgrieve | B60W 10/22 |

* cited by examiner

*Primary Examiner* — James M McPherson
(74) *Attorney, Agent, or Firm* — Quinn IP Law

(57) ABSTRACT

A cruise control method includes: receiving, by a controller of the vehicle, a set speed, a maximum allowed speed, and a minimum allowed speed, wherein each of the maximum allowed speed and the minimum allowed speed is a speed boundary of an allowed speed range; commanding, by the controller, a propulsion system to produce a commanded axle torque to maintain the set speed; monitoring a current speed of the vehicle; monitoring an elevation of a terrain at predetermined-upcoming locations of the vehicle based on upcoming elevation data from a map database; generating an elevation look-ahead table using the elevation of the terrain at the predetermined-upcoming locations of the vehicle; and determining projected speeds of the vehicle at each of the predetermined-upcoming locations of the vehicle as a function of the current speed of the vehicle and the elevation of the terrain at the predetermined-upcoming locations.

20 Claims, 11 Drawing Sheets

PREDICTIVE GRADE OPTIMIZATION IN CRUISE CONTROL

INTRODUCTION

The present disclosure relates to a method and system for predictive grade optimization in cruise control.

Cruise control is currently calibrated to rigidly control a driver's set speed, and can be aggressive and inefficient in its attempt to maintain that speed on changes in road grades. This leads to lower fuel economy and unnatural behavior (e.g., aggressive tip-ins and downshifts while going up hills, riding the brakes down hills, etc.).

SUMMARY

The present disclosure describes a method and system to control a cruise control of a vehicle.

Some cruise-control algorithms achieve improved fuel economy in cruise control by allowing for speed variation over grades, but the vehicle must react severely and inefficiently near the edges of the allowable speed window (on severe or extended grades) to remain within the driver's custom bandwidth. The presently disclosed predictive method uses upcoming elevation data to understand in advance when steady-state cruise control operation will lead to a speed violation (drifting outside the driver's bounds). The vehicle then prepares for the upcoming speed violation, and will adjust torque command at opportunistic moments (in efficient ways) using this understanding of the terrain ahead. The presently disclosed method receives driver inputs for set speed, minimum allowable speed, and maximum allowable speed in cruise control. Also, the presently disclosed method computes the axle torque required to maintain steady-state operation at the set speed on a flat road, assuming nominal road conditions (tire pressures, vehicle weight, no wind, etc.). The presently disclosed method commands and maintains steady-state engine operation at the nominal road load axle torque defined above, as long as the vehicle is not at risk of violating the driver's minimum/maximum speed constraints (and achieves higher fuel economy, in the process). The presently disclosed method uses upcoming elevation data to understand when a critical (maximum or minimum) speed may be violated by the upcoming grade profile. It then uses this information, in advance, to prepare for severe grades by: (a) ramping in torque opportunistically and preventing dropping below the driver's minimum allowed speed; and (b) using battery regen, powertrain downshifts, and vehicle brakes opportunistically to prevent exceeding the driver's maximum allowed speed In an aspect of the present disclosure, the presently disclosed cruise control method to control a vehicle includes: receiving, by a controller of the vehicle, a set speed, a maximum allowed speed, and a minimum allowed speed, wherein each of the maximum allowed speed and the minimum allowed speed is a speed boundary of an allowed speed range; commanding, by the controller, a propulsion system to produce a commanded axle torque to maintain the set speed; monitoring a current speed of the vehicle; monitoring an elevation of a terrain at predetermined-upcoming locations of the vehicle based on upcoming elevation data from a map database or vehicle sensors/cameras; generating an elevation look-ahead table using the elevation of the terrain at the predetermined-upcoming locations of the vehicle, wherein the elevation look-ahead table includes a plurality of look-ahead elevation points; determining projected speeds of the vehicle at each of the predetermined-upcoming locations of the vehicle as a function of the current speed of the vehicle and the elevation of the terrain at the predetermined-upcoming locations of the vehicle; generating a projected-speed table using the projected speeds of the vehicle at each of the predetermined-upcoming locations of the vehicle; comparing each of the projected speeds of the vehicle at each of the predetermined-upcoming locations with the allowed speed range; determining whether at least one of the projected speeds is outside the allowed speed range; and in response to determining that the at least one of the projected speeds is outside the allowed speed range, commanding, by the controller, the propulsion system of the vehicle to adjust the commanded axle torque in order to maintain an actual speed of the vehicle within the allowed speed range at each of the predetermined-upcoming locations.

The cruise control method may further include including identifying a first speed point in the projected-speed table that is less than the minimum allowed speed. The cruise control method may further include finding a first local minimum in the projected-speed table. The cruise control method may further include determining a distance from a current location of the vehicle to a location at the first local minimum, wherein the distance from the current location of the vehicle to the location at the first local minimum is a peak distance.

The cruise control method may further include setting a desired speed at the peak distance to be the minimum allowed speed. The cruise control method may further include computing a scaled projected speed table as a function of the minimum allowed speed and the first local minimum. The cruise control method may further include computing a required work input to achieve the minimum allowed speed at the peak distance as a function of a mass of the vehicle and the minimum allowed speed.

The cruise control method may further include calculating an adjustment to the current road load axle, torque required to achieve the minimum allowed speed at the peak distance as a function of the required work input. The cruise control method may further include re-computing the projected speed table as a function of the adjusted torque required to achieve the minimum allowed speed at the peak distance. The cruise control method may further include commanding the propulsion system to produce an updated-commanded axle torque, wherein the updated-commanded axle torque is equal to the adjusted torque required to achieve the minimum allowed speed at the peak distance plus the commanded axle torque.

The cruise control method may further include identifying a first speed point in the projected-speed table that is greater than the maximum allowed speed. The cruise control method may further include finding a first local maximum in the projected-speed table. The cruise control method may further include determining a distance from a current location of the vehicle to a location at the first local maximum, wherein the distance from the current location of the vehicle to the location at the first local maximum is a peak distance. The cruise control method may further include setting a desired speed at the peak distance to be the maximum allowed speed. The cruise control method may further include computing a scaled projected speed table as a function of the maximum allowed speed and the first local maximum.

The present disclosure also described a vehicle system including a controller programmed to execute the method described above. In an aspect of the present disclosure, the vehicle system, comprising: a propulsion system and a controller in communication with the propulsion system. The controller is programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
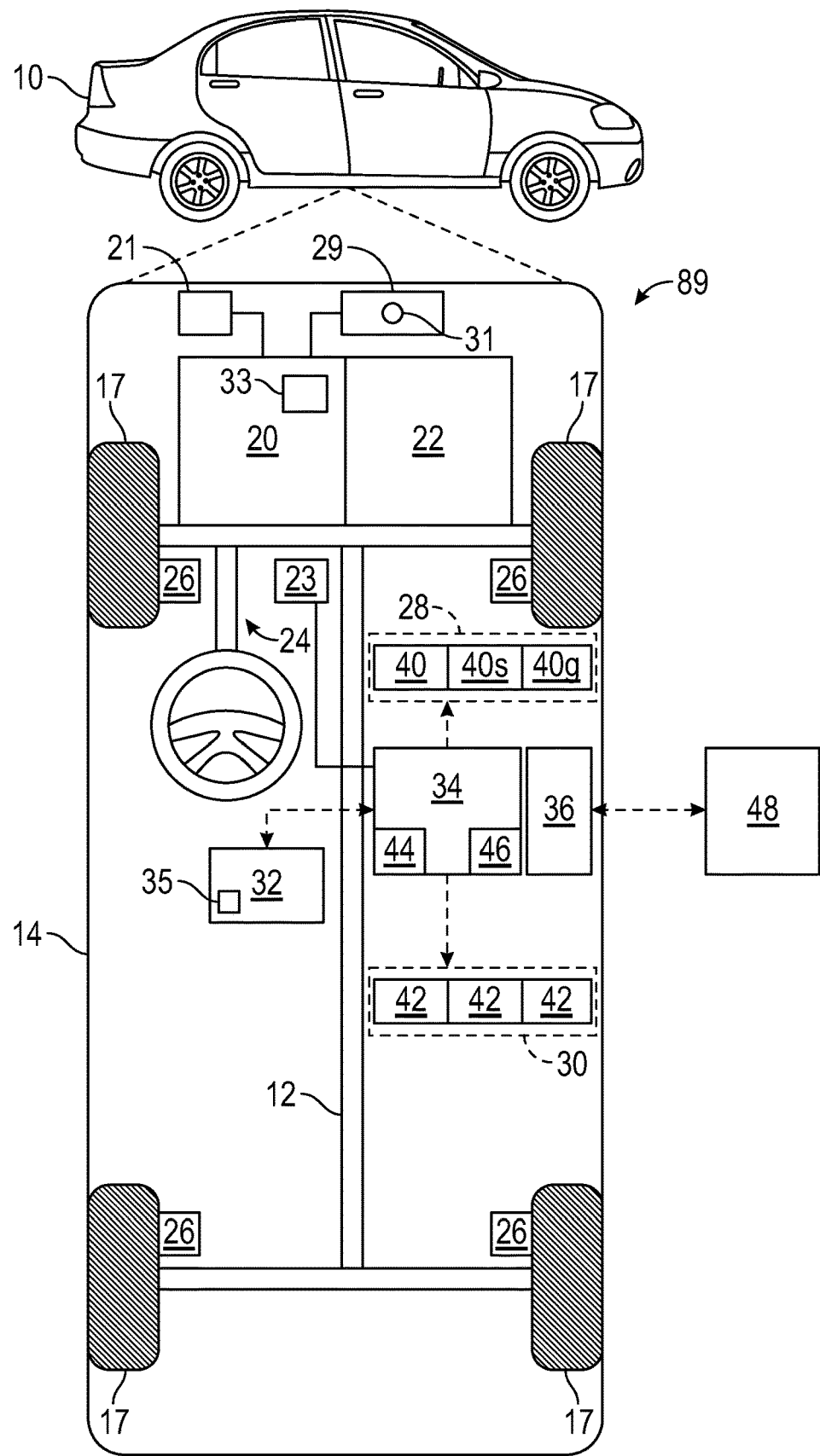
FIG. 1 is a schematic block diagram of a vehicle.

As depicted in FIG. 1, a vehicle 10 generally includes a chassis 12, a body 14, front and rear wheels 17 and may be referred to as the host vehicle. The vehicle 10 may be referred to as a motor vehicle. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

The vehicle 10 may be an autonomous vehicle, and a control system 89 is incorporated into the vehicle 10. The control system 89 may alternatively be referred to as a vehicle system. The vehicle 10 is, for example, a vehicle that is automatically controlled to carry passengers from one location to another. The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used. The vehicle 10 may be a so-called Level Four or Level Five automation system. A Level Four system indicates "high automation", referring to the driving mode-specific performance by an automated driving system of the aspects of the dynamic driving task, even if a human driver does not respond appropriately to a request to intervene. A Level Five system indicates "full automation", referring to the full-time performance by an automated driving system of the aspects of the dynamic driving task under different roadway and environmental conditions that can be managed by a human driver.

The vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine 33 having a plurality of cylinders. When the propulsion system 20 engages active fuel management (AFM), not all of the cylinders of the internal combustion engine 33 are active. Conversely, when the propulsion system disengages AFM, all of the cylinders of the internal combustion engine 33 are active. The transmission system 22 is configured to transmit power from the propulsion system 20 to the vehicle wheels 17 according to selectable speed ratios. The transmission system 22 may include a step-ratio automatic transmission, a continuously-variable transmission, or other appropriate transmission. The brake system 26 is configured to provide braking torque to the vehicle wheels 17. The brake system 26 may include friction brakes, brake by wire, a regenerative braking system such as an electric machine, and/or other appropriate braking systems. The steering system 24 influences a position of the vehicle wheels 17. While depicted as including a steering wheel for illustrative purposes, the steering system 24 may not include a steering wheel. The vehicle 10 may include an air-conditioning system 29 with a compressor 31 coupled to the internal combustion engine 33 of the propulsion system 20. The compressor 31 may be driven by the internal combustion engine 33.

The sensor system 28 includes one or more sensing devices 40 that sense observable conditions of the exterior environment and/or the interior environment of the vehicle 10. The sensing devices 40 may include, but are not limited to, radars, lidars, global positioning systems, optical cameras, thermal cameras, ultrasonic sensors, clocks for measuring time, and/or other sensors. The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensing system 28 includes one or more Global Positioning System (GPS) transceiver 40g configured to detect and monitor the route data (i.e., route information). The GPS transceiver 40g is configured to communicate with a GPS to locate the position of the vehicle 10 in the globe. The GPS transceiver 40g is in electronic communication with the controller 34.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The data storage device 32 and/or the computer readable storage device or media 46 may include a map database 35. In the present disclosure, the term 'map database" means a database that stores geographical and topographical data, such as roads, streets, cities, parks, traffic signs, elevation information, two-dimensional or three-dimensional arrangement of objections with attributes to location and category. The map database 35 includes data about the elevation E of a terrain Trr (FIG. 3) at predetermined-upcoming locations of the vehicle 10. The data about the elevation E of a terrain Trr (FIG. 3) at the predetermined-upcoming locations of the vehicle 10 is referred herein as upcoming elevation data ED. In the present disclosure, the terrain Trr is the terrain Trr in which the vehicle 10 is traveling or will be traveling. The map database 35 may alternatively be referred to as the map module.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 89. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured to receive inputs from the user via the user interface 23. The user interface 23 includes a display configured to display information to the user (e.g., vehicle operator or passenger).

Figure 2:
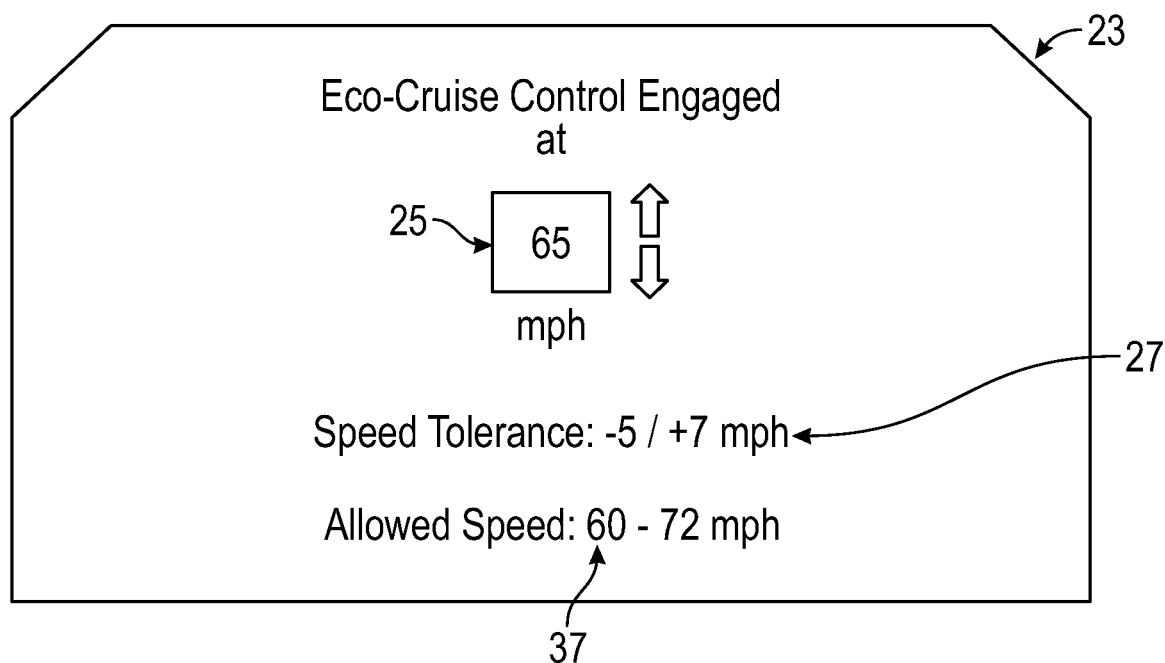
FIG. 2 is schematic diagram of part of a user interface of the vehicle of FIG. 1.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 is a schematic block diagram of the control system 89, which is configured to control the vehicle 10. The controller 34 of the control system 89 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include internal combustion engine 33 and, in that case, the propulsion actuator may be a throttle specially configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more speed sensors 40s configured to measure and monitor the speed (or velocity) of the vehicle 10. The speed sensor 40s is coupled to the controller 34 and is in electronic communication with one or more wheels 17. Accordingly, the controller 34 is programmed to monitor the speed of the vehicle 10 based on the input from the speed sensor 40s.

FIG. 2 is a schematic diagram of part of the user interface 23. The vehicle 10 has cruise control, and the driver's set speed 25 (shown in the user interface 23) can be adjusted by the driver with, for example, up/down arrows on the steering wheel of the vehicle 10. Aside from the driver's set speed 25, the user interface 23 also shows the speed tolerance 27, which includes a maximum allowed speed and a minimum allowed speed. The driver may adjust the maximum allowed speed and and/or minimum allowed of the speed tolerance using the user interface 23. The user interface 23 shows the allowed speed range 37, which is calculated as a function of the set speed, the maximum allowed speed, and the minimum allowed speed. The maximum allowed speed and the minimum allowed speed are each a speed boundary of an allowed speed range 37.

Figures 3, 4, 5:
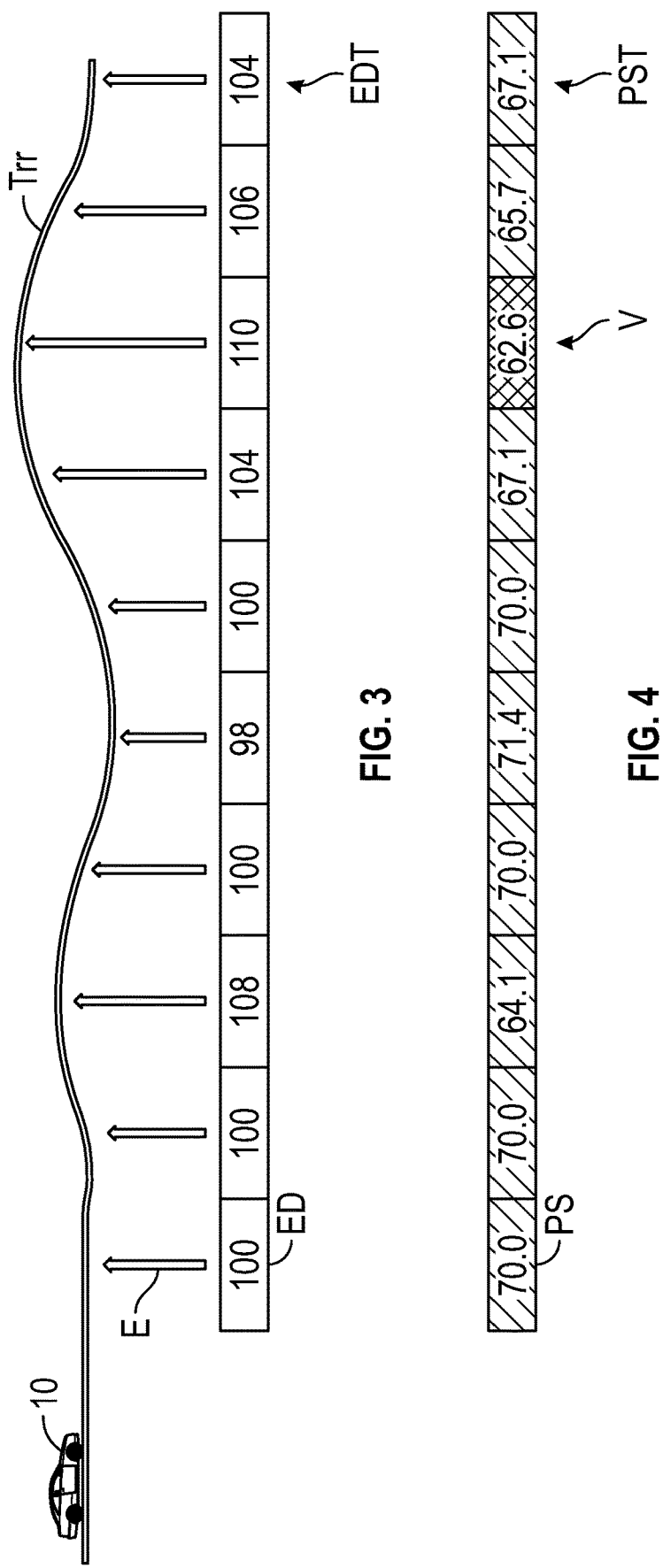
FIG. 3 is a schematic illustration of an elevation look-ahead table representing the elevation of the terrain at the predetermined-upcoming locations of the vehicle system.
FIG. 4 is a schematic illustration of a projected-speed table including the projected speeds of the vehicle system at each of the predetermined-upcoming locations of the vehicle system.
FIG. 5 is a schematic illustration of an updated, projected-speed table.

With reference to FIG. 3, the present disclosure describes a method 100 (FIG. 6) that uses upcoming elevation data ED in order to understand in advance when steady-state cruise control operation will lead to a speed violation (drifting outside the driver's bounds). The vehicle 10 can then prepare for the upcoming violation, and will adjust torque command at opportunistic moments (in efficient ways) using this understanding of the terrain Trr ahead. To do so, the controller 34 receives and monitors the elevation data ED about the upcoming terrain Trr from the map database 35 and/or vehicle sensors/cameras (e.g., a sensor system 28). As discussed above, the data about the elevation E of a terrain Trr (FIG. 3) at predetermined-upcoming locations of the vehicle 10 is referred herein as upcoming elevation data ED. Using this upcoming elevation data, the controller 34 then generates an elevation look-ahead table EDT as described in detail below. The elevation look-ahead table EDT includes a plurality of look-ahead elevation points. The look-ahead elevation points are equidistant from each other. In other words, the look-ahead points are separated from each other by a predetermined distance, and the first look-ahead point is separated from the current location of the vehicle 10 by the same predetermined distance.

With reference to FIG. 4, the controller 34 determines (i.e., calculates) a projected speed of the vehicle 10 at each look-ahead elevation point. In other words, the controller is programmed to determine the projected speeds of the vehicle 10 at each of the predetermined-upcoming locations of the vehicle 10 as a function of the current speed of the vehicle 10 and the elevation E of the terrain Trr at the predetermined-upcoming locations of the vehicle 10. Then, the controller 34 generates a projected-speed table PST using the projected speeds PS of the vehicle 10 at each of the predetermined-upcoming locations of the vehicle 10. Next, the controller 34 determines whether there is a speed violation V. In other words, the controller 34 determines whether one or more of the projected speeds is outside the allowed speed range 37 (FIG. 2) as discussed in detail below.

With reference FIG. 5, after identifying a speed violation V, the controller 34 computes the necessary increase in initial torque to accommodate the elevation change, resulting in meeting the speed allowed range 37 (FIG. 2). The increase in computed axle torque results in new projected speed profile for the same elevation, now allowing speed deviation allowance to be met. In others words, the controller 34 generates an updated, projected-speed table UPST based in the increased, computed axle torque as discussed in detail below.

Figure 6:
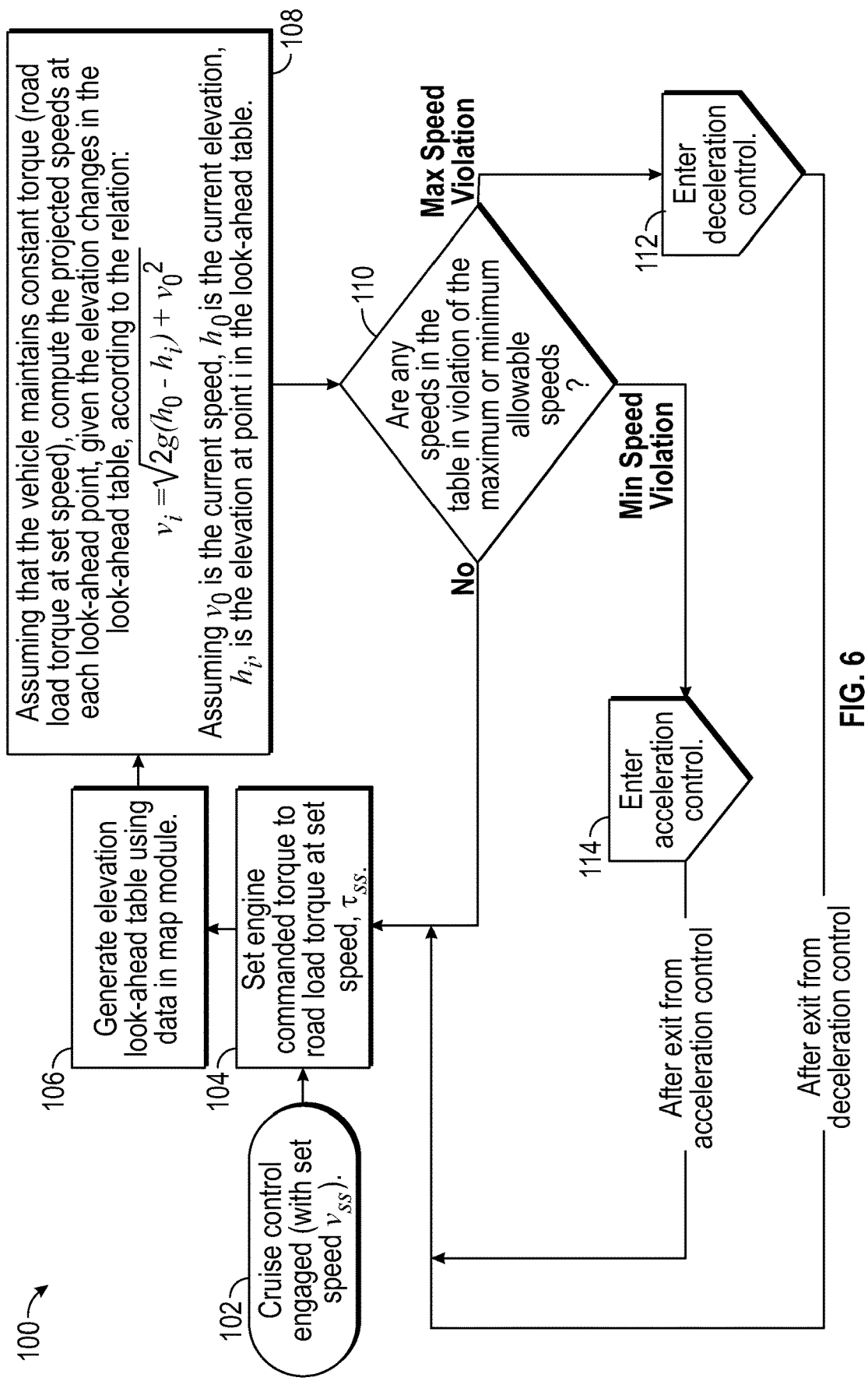
FIG. 6 is a flowchart of a method for controlling the cruise control of the vehicle system of FIG. 1 to optimize fuel economy.

FIG. 6 is a flowchart of a cruise control method 100 for controlling the cruise control of the vehicle 10 of FIG. 1 to optimize fuel economy. The method 100 begins at block 102. At block 102, the controller 34 determines that the cruise control has been engaged by the vehicle operator. The vehicle operator may engage the cruise control through the user interface 23. For instance, the vehicle operator may press a button on the user interface 23 to engage the cruise control. At block 102, the vehicle operator may also set the set speed $v_{ss}$, the maximum allowed speed $v_{max}$, and the minimum allowed speed $v_{min}$ through the user interface 23 by, for example, pressing up/down arrows on the steering wheel of the vehicle 10. Thus, at block 102, the controller 34 receives the set speed $v_{ss}$, the maximum allowed speed $v_{max}$, and the minimum allowed speed $v_{min}$ from the user interface 23. As discussed above, each of the maximum allowed speed $v_{max}$ and the minimum allowed speed $v_{min}$ is a speed boundary of the allowed speed range 37. At block 102, the controller 34 also determines and monitors (in real time) the current vehicle speed v based on the inputs of the speed sensor 40s. Then, the method 100 proceeds to block 104. At block 102, the controller 34 determines and monitors the elevation E of the terrain Trr at predetermined-upcoming locations of the vehicle 10 using the upcoming elevation data of the map database 35. After block 102, the method 100 proceeds to block 104.

At block 104, the controller 34 sets the commanded axle torque $\tau_{ss}$ to road load torque at the set speed $v_{ss}$. To do so, the controller 34 commands the propulsion system 20 to produce the commanded axle torque $\tau_{ss}$ in order to maintain the set speed $v_{ss}$. Then, the method 100 continues to block 106.

At block 106, the controller 34 generates the elevation look-ahead table EDT (FIG. 3) using the elevation E of the terrain Trr at the predetermined-upcoming locations of the vehicle 10. As discussed above, the elevation look-ahead table EDT (FIG. 3) includes a plurality of look-ahead elevation points, which correspond to the predetermined-upcoming locations of the vehicle 10. The controller 34 uses upcoming elevation data ED from the map database 35 to generate the elevation look-ahead table EDT. Therefore, block 106 also entails retrieving elevation data ED from the map database 35 and then using the upcoming elevation data ED to generate the elevation look-ahead table EDT. The look-ahead elevation points of the elevation look-ahead table EDT are equidistant from each other. In other words, the look-ahead points are separated from each other by a predetermined distance, and the first look-ahead point is separated from the current location of the vehicle 10 by the same predetermined distance. Then, the method 100 proceeds to block 108.

At block 108, the controller 34 determines projected speeds of the vehicle at each of the predetermined-upcoming locations of the vehicle as a function of the current speed $v_0$ of the vehicle 10 and the elevation E of the terrain Trr at the predetermined-upcoming locations of the vehicle 10. To do so, the controller 34 assumes the vehicle 10 maintains a constant torque (i.e., road load torque at set speed $v_{ss}$) and calculates the projected speeds at each look-ahead point in the elevation table EDT (given the changes in elevation in the elevation table EDT)) with the following equation:

$$v_i = \sqrt{2g(h_0 - h_i) + v_0^2}$$

where $v_0$ is the current speed of the vehicle 10;

$h_0$ is the current elevation of the terrain Trr at the current location of the vehicle 10;

$h_i$ is the elevation at point i in the elevation look-ahead table EDT;

g is the gravitational acceleration; and $v_i$ is the projected speed at point i in the elevation look-ahead table EDT.

Using the equations above, the controller 34 calculates the projected speed at each look-ahead point and generates the projected-speed table PST (FIG. 4) using the projected speeds of the vehicle 10 at each of the predetermined-upcoming locations of the vehicle 10. After block 108, the method 100 proceeds to block 110.

At block 110, the controller 34 compares each of the projected-speeds at each of the predetermined-upcoming locations with the allowed speed range 37 to determine whether any of the projected speeds is outside the allowed speed range 37. In other words, at block 110, the controller 34 determines whether there are any projected speeds in the projected-speed table PST (FIG. 4) in violation of the maximum allowed speed $v_{max}$ and/or the minimum allowed speed $v_{min}$. If there are no projected speeds that are in violation of the maximum allowed speed $v_{max}$ and/or the minimum allowed speed $v_{min}$, the method 100 returns to block 104. If there are projected speeds that are in violation of the maximum allowed speed $v_{max}$, the controller 34 begins the deceleration control process 300 (FIGS. 8A, 8B, 8C, and 8D) at block 112. In the deceleration control process 300, the controller 34 commands the propulsion system 20 of the vehicle 10 to adjust the commanded axle torque to maintain the actual speed of the vehicle 10 within the allowed speed range 37 at each of the predetermined-upcoming locations. After executing the deceleration control process, the method 100 proceeds to returns to block 104. If there are projected speeds that are in violation of the minimum allowed speed $v_{min}$, the controller 34 begins the acceleration control process 200 (FIGS. 7A, 7B, and 7C) at block 114. In the acceleration control process 200, the controller 34 commands the propulsion system 20 of the vehicle 10 to adjust the commanded axle torque to maintain the actual speed of the vehicle 10 within the allowed speed range 37 at each of the predetermined-upcoming locations. After executing the acceleration control process, the method 100 returns to block 104.

Figure 7A:
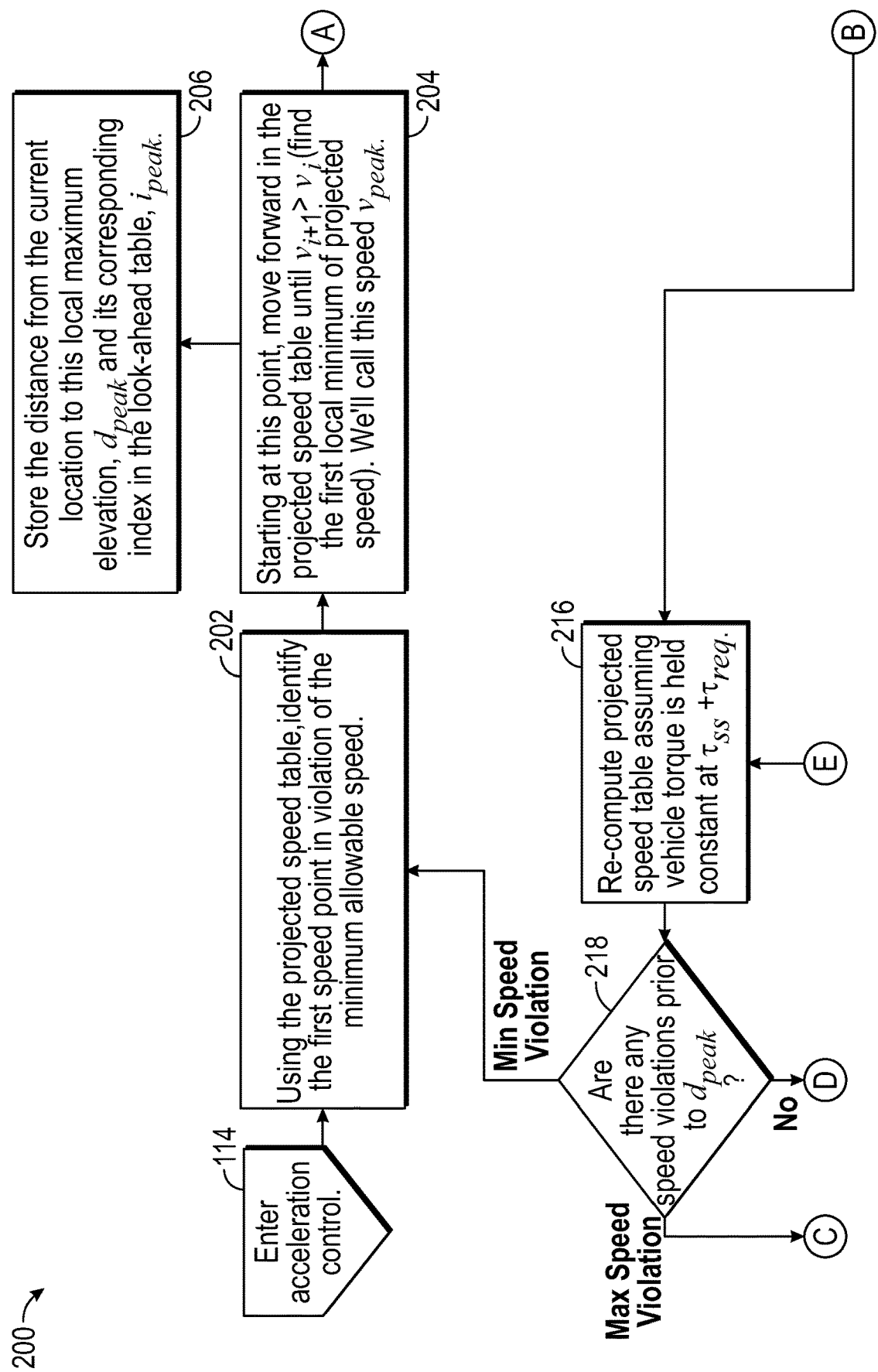
FIG. 7A is a first part of an acceleration control process of the method of FIG. 6.
Figure 7B:
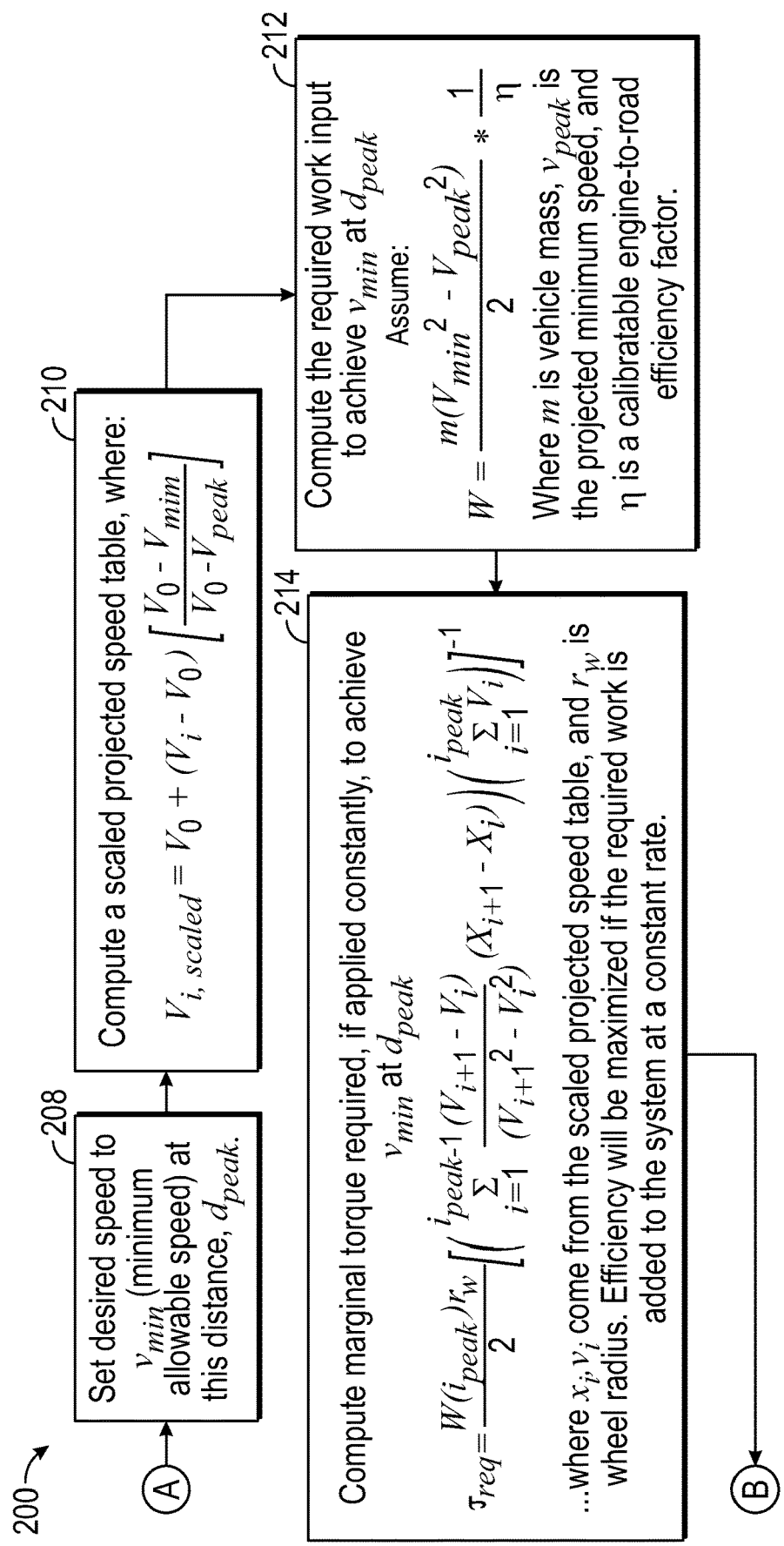
FIG. 7B is a second part of the acceleration control process of the method of FIG. 6.
Figure 7C:
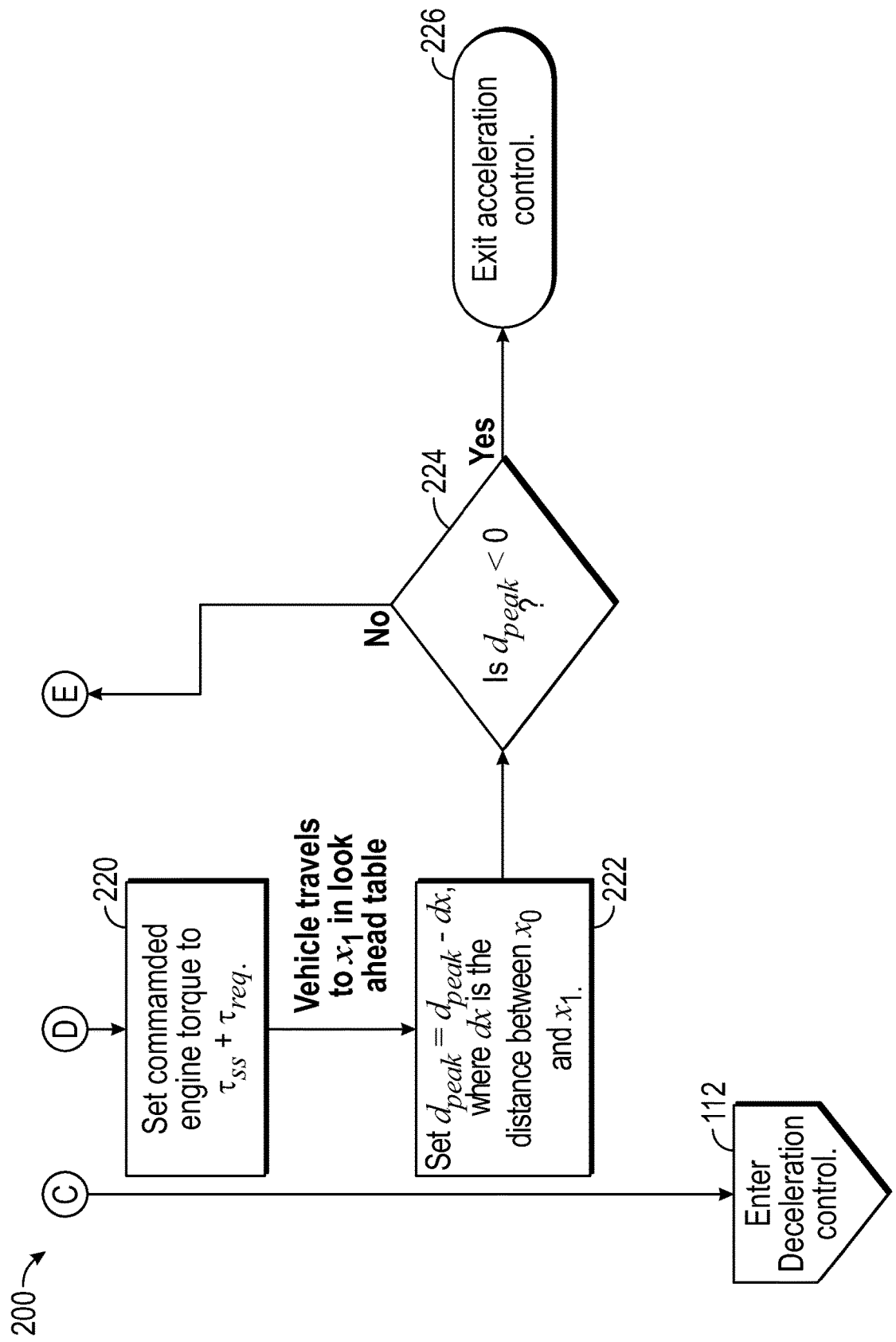
FIG. 7C is a third part of the acceleration control process of the method of FIG. 6.
Figure 8A:
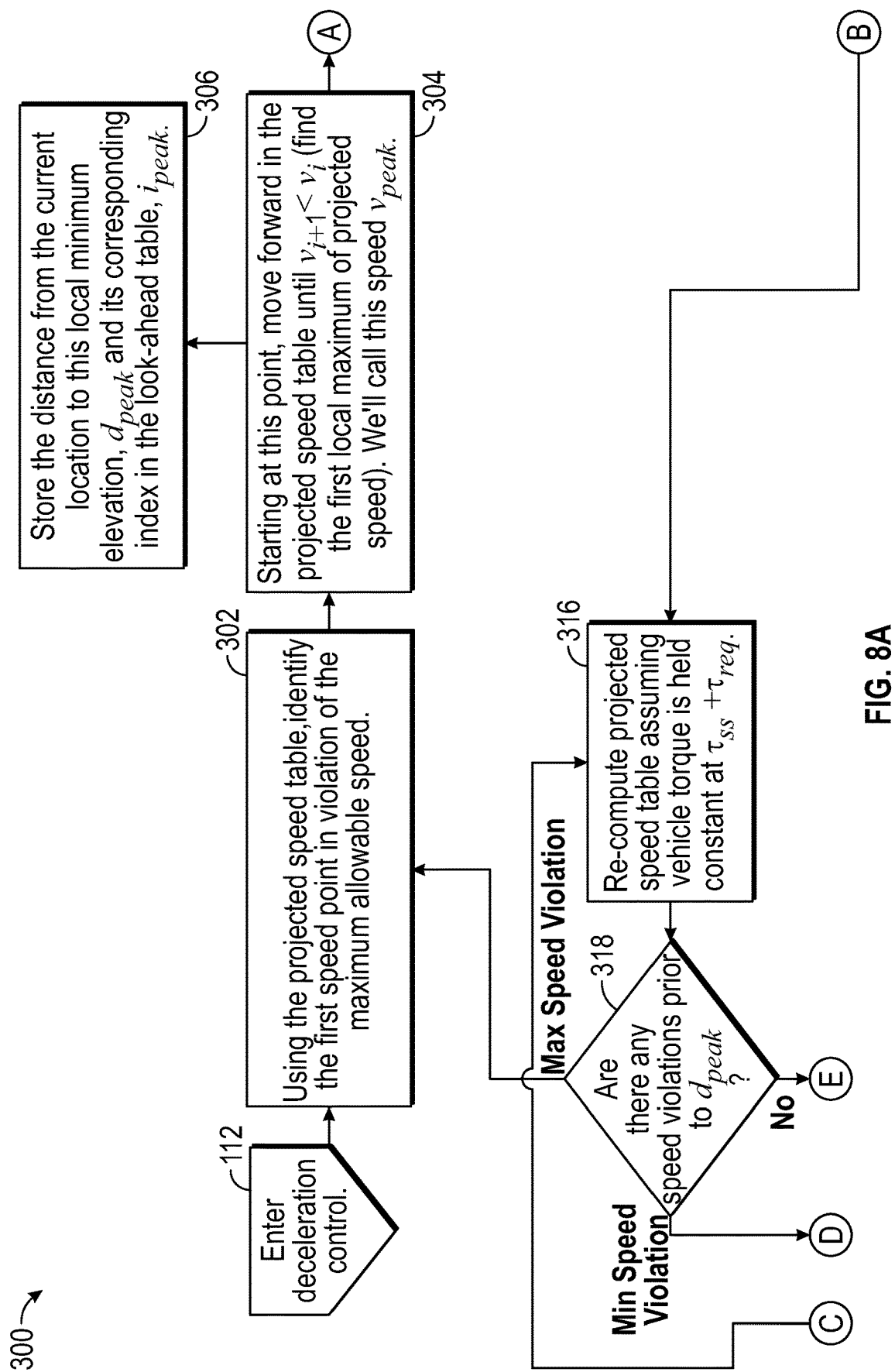
FIG. 8A is a first part of a deceleration control process of the method of FIG. 6.
Figure 8B:
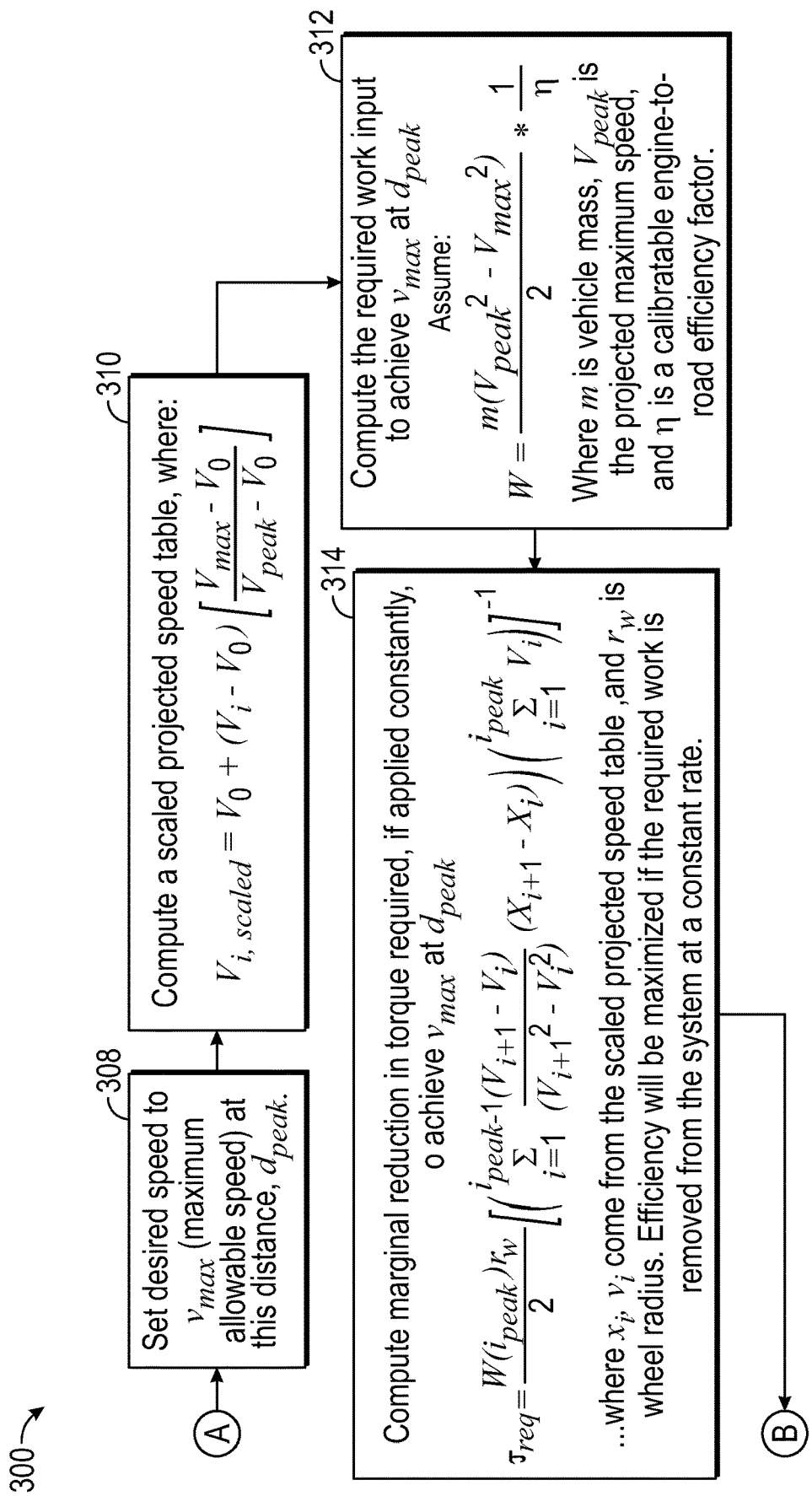
FIG. 8B is a second part of the deceleration control process of the method of FIG. 6.
Figure 8C:
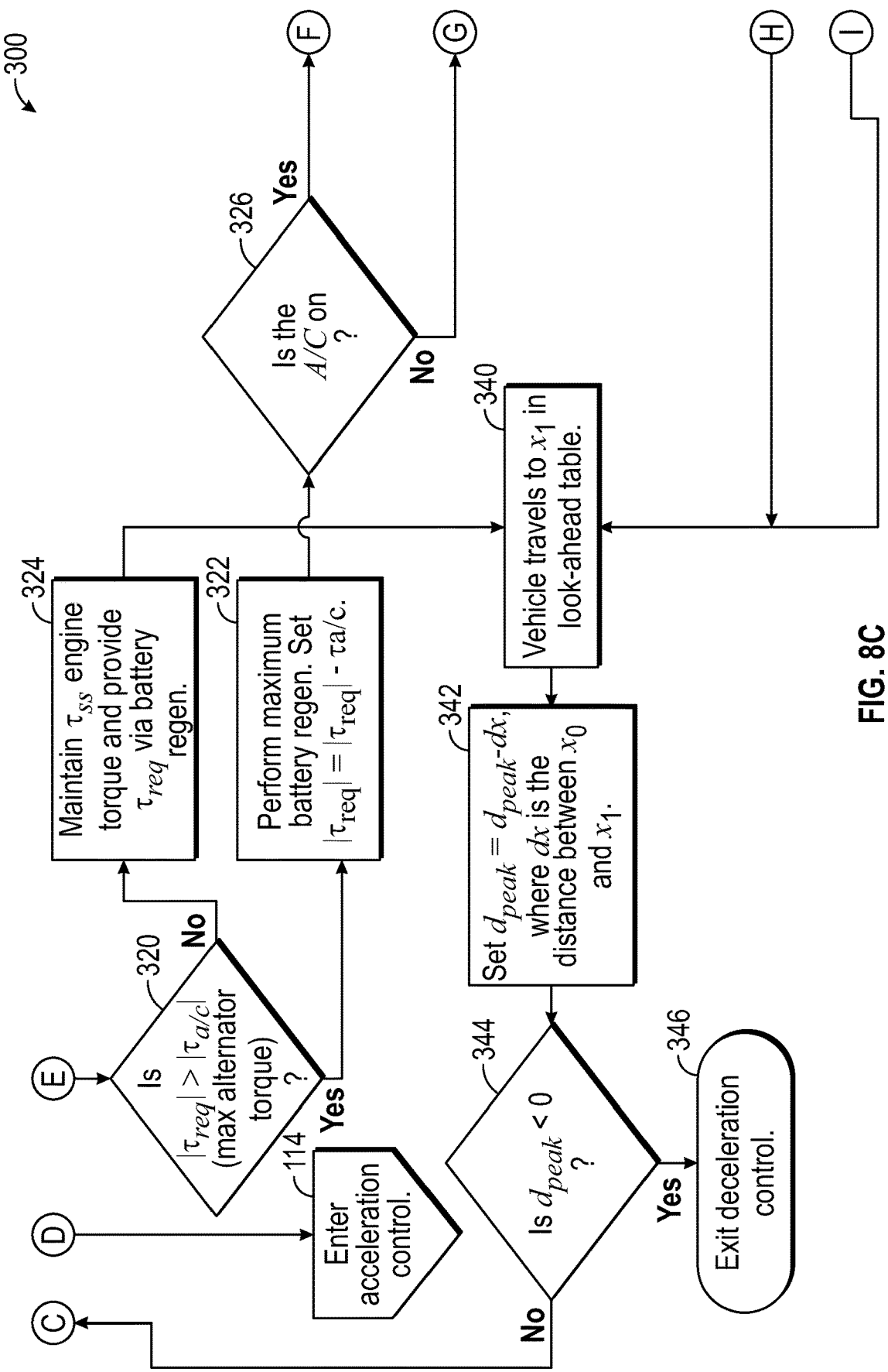
FIG. 8C is a third part of the deceleration control process of the method of FIG. 6.
Figure 8D:
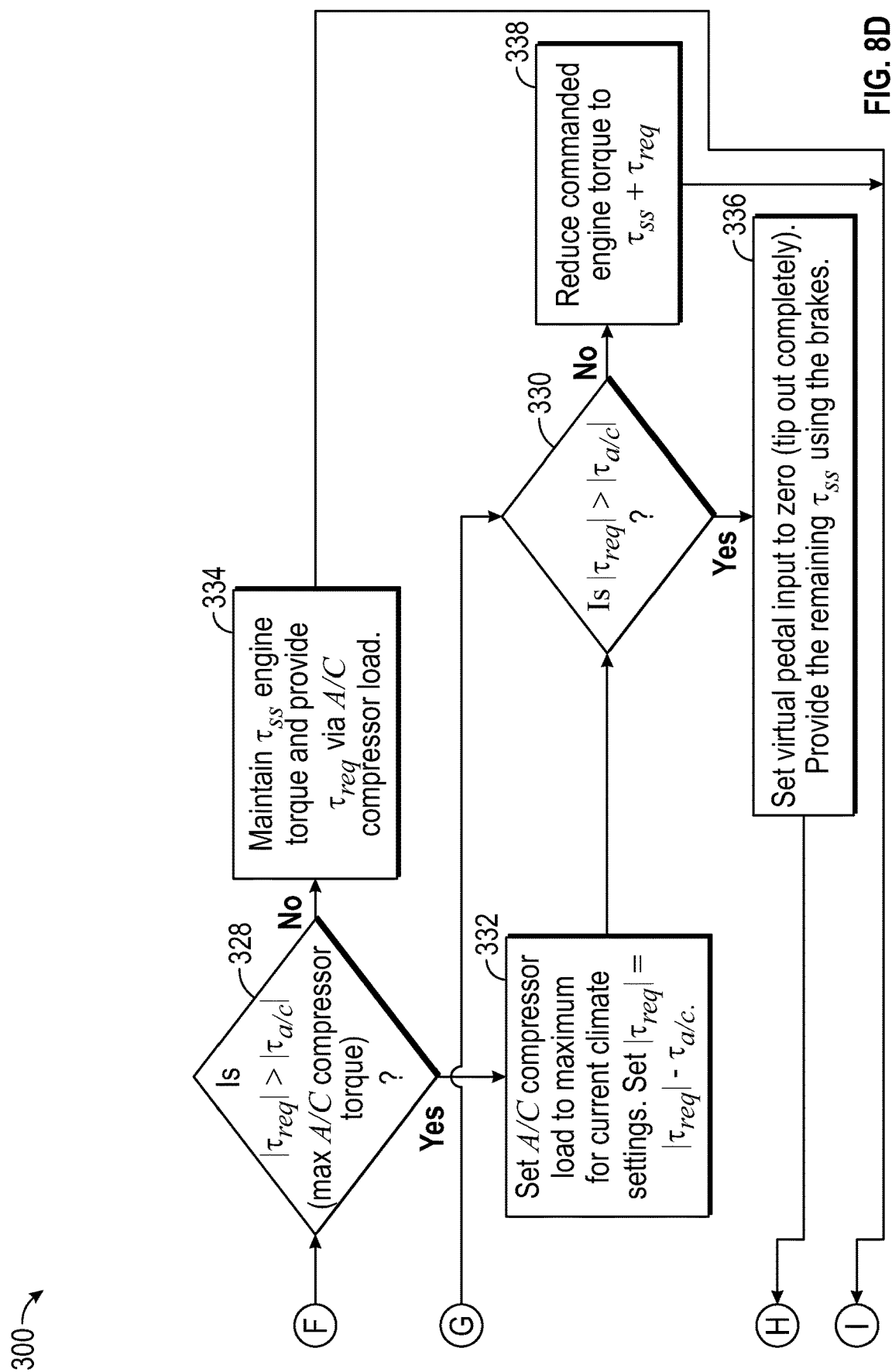
FIG. 8D is a fourth part of the deceleration control process of the method of FIG. 6.

FIGS. 7A, 7B, and 7C illustrate the acceleration control process 200. At block 114 (as discussed above), the controller 34 enters acceleration control (i.e., begins the acceleration control process 200). Then, the acceleration control process 200 proceeds to block 202. At block 202, the controller 34 uses the projected-speed table PST to identify a first speed point in violation of the minimum allowed speed $v_{min}$. In other words, the controller 34 identifies the first speed point in the projected-speed table PST that is less than the minimum allowed speed $v_{min}$. After block 202, the acceleration control process 200 continues to block 204.

At block 204, the controller 34, starting at the first speed point identified in block 202, moves forward in the projected-speed table PST until $v_{i+1} > v_i$ in order to find the first local minimum of the projected speed). In the acceleration control process 200, this first local minimum of the projected speed is referred to as $v_{peak}$. After block 204, the method proceeds to block 206. The first local minimum $v_{peak}$ of the projected speed may correspond to a local maximum elevation in the elevation look-ahead table EDT. Thus, controller 34 also determines the local maximum elevation in the elevation look-ahead table EDT and its corresponding index $i_{peak}$ in the elevation look-ahead table EDT. Next, the acceleration control process 200 continues to block 206.

At block 206, the controller 34 determines and stores the distance from the current location of the vehicle 10 to the local maximum elevation and its corresponding index $i_{peak}$ in the elevation look-ahead table EDT. The distance from the current location of the vehicle 10 to the local maximum elevation is referred to as a peak distance $d_{peak}$. After block 204, the acceleration control process 200 continues to block 208.

At block 208, the controller 34 sets the desired speed at the peak distance $d_{peak}$ to be the minimum allowed speed $v_{min}$. After block 208, the acceleration control process 200 proceeds to block 210.

At block 210, the controller 34 computes a scaled, projected-speed table, such as an updated, projected-speed table UPST shown in FIG. 5. To do so, the controller 34 may use the following equation:

$$v_{i,scaled} = v_0 + (v_i - v_0)\left[\frac{v_0 - v_{min}}{v_0 - v_{peak}}\right]$$

where:

$v_0$ is the current speed of the vehicle 10;

$v_i$ is a projected speed of the vehicle 10 at an index point i;

$v_{min}$ is the minimum allowed speed;

$v_{peak}$ is the first local minimum of the projected speed determined in block 204; and $v_{i,scaled}$ is the scaled, projected speed of the vehicle 10 at an index point i.

By using the above equation, the controller 34 generates a scaled, projected-speed table. Thus, the controller 34 computes the scaled, projected-speed table a function of the minimum allowed speed $v_{min}$ and the first local minimum $v_{peak}$. After block 210, the acceleration control process 200 proceeds to block 212.

At block 212, the controller 34 calculates the required work input W to achieve the minimum allowed speed $v_{min}$ at the peak distance $d_{peak}$. To do so, the controller 34 may use the following equation:

$$W = \frac{m(v_{min}^2 - v_{peak}^2)}{2} \cdot \frac{1}{\eta}$$

where:

m is the mass of vehicle 10;

$v_{peak}$ is the first local minimum of the projected speed determined in block 204;

η is a calibratable (and/or learned) engine-to-road efficiency factor;

$v_{min}$ is the minimum allowed speed;

W is the required work input to achieve the minimum allowed speed $v_{min}$ at the peak distance $d_{peak}$.

After determining the required work input W to achieve the minimum allowed speed $v_{min}$ at the peak distance $d_{peak}$, the acceleration control process 200 proceeds to block 214.

At block 214, the controller 34 calculates the adjusted torque $\tau_{req}$ required (if applied constantly) to achieve the minimum allowed speed $v_{min}$ at the peak distance $d_{peak}$ using the following equation:

$$\tau_{req} = \frac{W(i_{peak})r_w}{2} \left[ \left( \sum_{i=1}^{i_{peak}-1} \frac{(v_{i+1} - v_i)}{(v_{i+1}^2 - v_i^2)}(x_{i+1} - x_i) \right) \left( \sum_{i=1}^{i_{peak}} v_i \right) \right]^{-1}$$

where:

$r_w$ is the radius of one of the wheels 17 (i.e., the wheel radius);

$v_i$ is the projected speed at index point i in the scaled, projected-speed table generated in block 210;

$x_i$ is the distance from the current location of the vehicle 10 to the index point i in the scaled, projected-speed table generated in block 210;

$v_{i+1}$ is the projected speed at index point i+1 in the scaled, projected-speed table generated in block 210;

$i_{peak}$ is the index point (i.e., location) at the first local minimum $v_{peak}$ is of the projected speed;

$i_{peak-1}$ is the index point (i.e., location) immediately before the first local minimum $v_{peak}$ is of the projected speed; and $\tau_{req}$ is the adjusted torque required (if applied constantly) to achieve the driver defined speed minimum speed limit $v_{min}$;

At block 214, the efficiency will be maximized if the required work W is added to the system at a constant rate. After block 214, the acceleration control process 200 proceeds to block 216.

At block 216, the controller 34 re-computes the projected speed table assuming that the commanded axle torque is held constant at the sum of the adjusted torque $\tau_{req}$ required (if applied constantly) to achieve the minimum allowed speed $v_{min}$ at the peak distance $d_{peak}$ and the commanded axle torque $\tau_{ss}$ to road load torque at the set speed $v_{ss}$. After block 216, the acceleration control process 200 proceeds to block 218.

At block 218, the controller 34 determines whether there are any speed violations prior to the peak distance $d_{peak}$. If there are minimum speed violations prior to the peak distance $d_{peak}$, then the acceleration control process 200 returns to block 202. If there are maximum speed violations prior to the peak distance $d_{peak}$, then the controller 34 begins the deceleration control process 300 (FIGS. 8A, 8B, 8C, and 8D) at block 112. If there are no speed violations prior to the peak distance $d_{peak}$, then the acceleration control process 200 proceeds to block 220.

At block 220, the controller 34 sets the commanded engine torque to the sum of the adjusted torque $\tau_{req}$ required (if applied constantly) to achieve the minimum allowed speed $v_{min}$ at the peak distance $d_{peak}$ and the commanded axle torque $\tau_{ss}$ to road load torque at the set speed $v_{ss}$. Also, the controller 34 commands the propulsion system 20 to produce an updated, commanded axle torque. This updated, commanded axle torque may be equal to the adjusted torque $\tau_{req}$ required (if applied constantly) to achieve the minimum allowed speed $v_{min}$ at the peak distance $d_{peak}$ plus the commanded axle torque $\tau_{ss}$ to road load torque at the set speed $v_{ss}$. Then, the acceleration control process 200 proceeds to block 222.

Between block 220 and 222, the vehicle 10 travels to the look-ahead point $x_1$ in the elevation look-ahead table EDT. At block 222, the controller 34 sets the peak distance $d_{peak}$ using the following equation:

$$d_{peak} = d_{peak} - dx$$

where:

$d_{peak}$ is the peak distance; and dx is the distance between look-ahead pint $x_0$ and look-ahead point $x_1$ in the elevation look-ahead table EDT.

After block 222, the acceleration control process 200 proceeds to block 224.

At block 224, the controller 34 determines whether the newly set peak distance $d_{peak}$ is less than zero. If the newly set peak distance $d_{peak}$ is not less than zero, then the acceleration control process 200 returns to block 216. If the newly set peak distance $d_{peak}$ is less than zero, then the acceleration control process 200 proceeds to block 226. At block 226, the controller 34 exits acceleration control.

FIGS. 8A, 8B, 8C and 8D illustrate the deceleration control process 300. At block 112 (as discussed above), the controller 34 enters deceleration control (i.e., begins the deceleration control process 300). Then, the deceleration control process 300 proceeds to block 302. At block 302, the controller 34 uses the projected-speed table PST to identify a first speed point in violation of the maximum allowed speed $v_{max}$. In other words, the controller 34 identifies the first speed point in the projected-speed table PST that is greater than the maximum allowed speed $v_{max}$. After block 302, the deceleration control process 300 continues to block 304.

At block 304, the controller 34, starting at the first speed point identified in block 302, moves forward in the projected-speed table PST until $v_{i+1} < v_i$ in order to find the first local maximum of the projected speed). In the deceleration control process 300, this first local maximum of the projected speed is referred to as $v_{peak}$. After block 304, the method proceeds to block 306. The first local maximum $v_{peak}$ of the projected speed may correspond to a local minimum elevation in the elevation look-ahead table EDT. Thus, controller 34 also determines the local maximum elevation in the elevation look-ahead table EDT and its corresponding index $i_{peak}$ in the elevation look-ahead table EDT. Next, the deceleration control process 300 continues to block 306.

At block 306, the controller 34 determines and stores the distance from the current location of the vehicle 10 to the local minimum elevation and its corresponding index $i_{peak}$ in the elevation look-ahead table EDT. The distance from the current location of the vehicle 10 to the local minimum elevation is referred to as a peak distance $d_{peak}$. After block 304, the deceleration control process 300 continues to block 308.

At block 308, the controller 34 sets the desired speed at the peak distance $d_{peak}$ to be the maximum allowed speed $v_{max}$. After block 308, the deceleration control process 300 proceeds to block 310.

At block 310, the controller 34 computes a scaled, projected-speed table, such as an updated, projected-speed table UPST shown in FIG. 5. To do so, the controller 34 may use the following equation:

$$v_{i,scaled} = v_0 + (v_i - v_0) \left[ \frac{v_{max} - v_0}{v_{peak} - v_0} \right]$$

where:

$v_0$ is the current speed of the vehicle 10;

$v_i$ is a projected speed of the vehicle 10 at an index point i;

$v_{max}$ is the maximum allowed speed;

$v_{peak}$ is the first local maximum of the projected speed determined in block 304; and $v_{i,scaled}$ is the scaled, projected speed of the vehicle 10 at an index point i.

By using the above equation, the controller 34 generates a scaled, projected-speed table. Thus, the controller 34 computes the scaled, projected-speed table a function of the maximum allowed speed $v_{max}$ and the first local maximum $v_{peak}$. After block 310, the deceleration control process 300 proceeds to block 312.

At block 312, the controller 34 calculates the required work input W to achieve the maximum allowed speed $v_{max}$ at the peak distance $d_{peak}$. To do so, the controller 34 may use the following equation:

$$W = \frac{m(v_{peak}^2 - v_{max}^2)}{2} \cdot \frac{1}{\eta}$$

where:

m is the mass of vehicle 10;

$v_{peak}$ is the first local maximum of the projected speed determined in block 304;

$\eta$ is a calibratable engine-to-road efficiency factor;

$v_{max}$ is the maximum allowed speed;

W is the required work input to achieve the maximum allowed speed $v_{min}$ at the peak distance $d_{peak}$.

After determining the required work input W to achieve the maximum allowed speed $v_{max}$ at the peak distance $d_{peak}$, the deceleration control process 300 proceeds to block 314.

At block 314, the controller 34 calculates the adjusted reduction in torque $\tau_{req}$ required (if applied constantly) to achieve the maximum allowed speed $v_{max}$ at the peak distance $d_{peak}$ using the following equation:

$$\tau_{req} = \frac{W(i_{peak})r_w}{2} \left[ \left( \sum_{i=1}^{i_{peak}-1} \frac{(v_{i+1} - v_i)}{(v_{i+1}^2 - v_i^2)} (x_{i+1} - x_i) \right) \left( \sum_{i=1}^{i_{peak}} v_i \right) \right]^{-1}$$

where:

$r_w$ is the radius of one of the wheels 17 (i.e., the wheel radius);

$v_i$ is the projected speed at index point i in the scaled, projected-speed table generated in block 210;

$x_i$ is the distance from the current location of the vehicle 10 to the index point i in the scaled, projected-speed table generated in block 210;

$v_{i+1}$ is the projected speed at index point i+1 in the scaled, projected-speed table generated in block 210;

$i_{peak}$ is the index point (i.e., location) at the first local minimum $v_{peak}$ is of the projected speed;

$i_{peak-1}$ is the index point (i.e., location) immediately before the first local minimum $v_{peak}$ is of the projected speed; and $\tau_{req}$ is the adjusted torque required (if applied constantly) to achieve the maximum driver defined speed limit $v_{max}$;

At block 314, the efficiency will be maximized if the required work W is added to the system at a constant rate. After block 314, the deceleration control process 300 proceeds to block 316.

At block 316, the controller 34 re-computes the projected speed table assuming that the commanded axle torque is held constant at the sum of the adjusted reduction in torque $\tau_{req}$ required (if applied constantly) to achieve the maximum allowed speed $v_{max}$ at the peak distance $d_{peak}$ and the commanded axle torque $\tau_{ss}$ to road load torque at the set speed $v_{ss}$. After block 318, the deceleration control process 300 proceeds to block 318.

At block 318, the controller 34 determines whether there are any speed violations prior to the peak distance $d_{peak}$. If there are maximum speed violations prior to the peak distance $d_{peak}$, then the deceleration control process 300 returns to block 302. If there are minimum speed violations prior to the peak distance $d_{peak}$, then the controller 34 begins the acceleration control process 200 (FIGS. 7A, 7B, and 7C) at block 114. If there are no speed violations prior to the peak distance $d_{peak}$, then the deceleration control process 300 proceeds to block 320.

At block 320, the controller 34 compares the absolute value of the adjusted reduction in torque $\tau_{req}$ required (if applied constantly) to achieve the maximum allowed speed $v_{max}$ at the peak distance $d_{peak}$ with the absolute value of the torque necessary to run the air-conditioning system 29 (i.e., the maximum alternator torque). If the absolute value of the adjusted reduction in torque $\tau_{req}$ required (if applied constantly) to achieve the maximum allowed speed $v_{max}$ at the peak distance $d_{peak}$ is greater than the absolute value of the torque necessary to run the air-conditioning system 29, then the deceleration control process 300 proceeds to block 322. If the absolute value of the adjusted reduction in torque $\tau_{req}$ required (if applied constantly) to achieve the maximum allowed speed $v_{max}$ at the peak distance $d_{peak}$ is not greater than the absolute value of the torque necessary to run the air-conditioning system 29, then the deceleration control process 300 proceeds to block 324.

At block 324, the controller 34 maintains the commanded axle torque $\tau_{ss}$. Also, the adjusted reduction in torque $\tau_{req}$ required (if applied constantly) to achieve the maximum allowed speed $v_{max}$ at the peak distance $d_{peak}$ is provided via battery regeneration. In the battery regeneration, the propulsion system 20 charges the battery 21 of the vehicle 10. After block 324, the deceleration control process 300 proceeds to block 340.

At block 340, the vehicle 10 travels look-ahead point $x_1$ in the elevation look-ahead table EDT. After block 340, the deceleration control process 300 proceeds to block 342.

At block 342, the controller 34 sets the peak distance $d_{peak}$ using the following equation:

$$d_{peak} = d_{peak} - dx$$

where:

$d_{peak}$ is the peak distance; and dx is the distance between look-ahead pint $x_0$ and look-ahead point $x_1$ in the elevation look-ahead table EDT.

After block 342, the deceleration control process 300 proceeds to block 344.

At block 344, the controller 34 determines whether the newly set peak distance $d_{peak}$ is less than zero. If the newly set peak distance $d_{peak}$ is not less than zero, then the deceleration control process 300 returns to block 316. If the newly set peak distance $d_{peak}$ is less than zero, then the deceleration control process 300 proceeds to block 346. At block 346, the controller 34 exits deceleration control.

At block 322, the controller 34 commands the propulsion system 20 to engage a maximum battery regeneration. In the maximum battery regeneration, the propulsion system 20 charges the battery 21 of the vehicle 10. In the second deceleration mode, the propulsion system 20 drives a compressor 31 of the air conditioning system 29. At block 322, the controller 34 sets the absolute value of the adjusted reduction in torque $\tau_{req}$ required (if applied constantly) to achieve the maximum allowed speed $v_{max}$ at the peak distance $d_{peak}$ to be equal to the absolute value of the adjusted reduction in torque $\tau_{req}$ required (if applied constantly) to achieve the maximum allowed speed $v_{max}$ at the peak distance $d_{peak}$ minus the torque necessary to run the air-conditioning system 29. After block 322, the deceleration control process 300 proceeds to block 326.

At block 326, the controller 34 determines if the air conditioning system 29 is on. If the air conditioning system 29 is on, then the deceleration control process 300 proceeds to block 328. If the air conditioning system 29 is off, then the deceleration control process 300 proceeds to block 330.

At block 328, the controller 34 compares the absolute value of the newly set adjusted reduction in torque $\tau_{req}$ required (if applied constantly) to achieve the maximum allowed speed $v_{max}$ at the peak distance $d_{peak}$ with the absolute value of the torque necessary to run the air-conditioning system 29 (i.e., the maximum A/C compressor torque). The maximum A/C compressor torque is the maximum torque required to run the compressor 31 of the air-conditioning system 29. If the absolute value of the adjusted reduction in torque $\tau_{req}$ required (if applied constantly) to achieve the maximum allowed speed $v_{max}$ at the peak distance $d_{peak}$ is greater than the absolute value of the torque necessary to run the air-conditioning system 29, then the deceleration control process 300 proceeds to block 332. If the absolute value of the adjusted reduction in torque $\tau_{req}$ required (if applied constantly) to achieve the maximum allowed speed $v_{max}$ at the peak distance $d_{peak}$ is not greater than the absolute value of the torque necessary to run the air-conditioning system 29, then the deceleration control process 300 proceeds to block 334.

At block 332, the controller 34 sets the maximum A/C compressor load to maximum for current climate settings. At block 332, the controller 34 sets the absolute value of the newly set adjusted reduction in torque $\tau_{req}$ required (if applied constantly) to achieve the maximum allowed speed $v_{max}$ at the peak distance $d_{peak}$ to be equal to the absolute value of the adjusted reduction in torque $\tau_{req}$ required (if applied constantly) to achieve the maximum allowed speed $v_{max}$ at the peak distance $d_{peak}$ minus the maximum torque required to run the compressor 31 of the air-conditioning system 29. After block 332, the deceleration control process 300 proceeds to block 330.

At block 334, the controller 34 maintains the commanded axle torque $\tau_{ss}$. Also, the adjusted reduction in torque $\tau_{req}$ required (if applied constantly) to achieve the maximum allowed speed $v_{max}$ at the peak distance $d_{peak}$ is provided via the A/C compressor load (i.e., the load of the compressor 31 of the air-conditioning system 29. After block 334, the deceleration control process 300 proceeds to block 340.

At block 330, the controller 34 compares the absolute value of the newly set adjusted reduction in torque $\tau_{req}$ required (if applied constantly) to achieve the maximum allowed speed $v_{max}$ at the peak distance $d_{peak}$ with the absolute value of the torque necessary to run the air-conditioning system 29. If the absolute value of the newly set adjusted reduction in torque $\tau_{req}$ required (if applied constantly) to achieve the maximum allowed speed $v_{max}$ at the peak distance $d_{peak}$ is greater than the absolute value of the torque necessary to run the air-conditioning system 29, then the deceleration control process 300 proceeds to block 336. If the absolute value of the newly set adjusted reduction in torque $\tau_{req}$ required (if applied constantly) to achieve the maximum allowed speed $v_{max}$ at the peak distance $d_{peak}$ is not greater than the absolute value of the torque necessary to run the air-conditioning system 29, then the deceleration control process 300 proceeds to block 338.

At block 336, the controller 34 sets the virtual pedal input to zero (tip out completely). In other words, the controller 34 commands the propulsion system 20 to produce zero torque. At block 336, the controller 34 commands the brake system 26 to actuate to provide the remaining commanded axle torque $\tau_{ss}$. After block 336, the deceleration control process 300 proceeds to block 340.

At block 338, the controller 34 sets the commanded engine torque to the sum of the adjusted reduction in torque $\tau_{req}$ required (if applied constantly) to achieve the maximum allowed speed $v_{max}$ at the peak distance $d_{peak}$ and the commanded axle torque $\tau_{ss}$ to road load torque at the set speed $v_{ss}$. In other words, the controller 34 commands the propulsion system 20 to reduce the commanded axle torque to the sum of the adjusted reduction in torque $\tau_{req}$ required (if applied constantly) to achieve the maximum allowed speed $v_{max}$ at the peak distance $d_{peak}$ and the commanded axle torque $\tau_{ss}$ to road load torque at the set speed $v_{ss}$. After block 338, the deceleration control process 300 proceeds to block 340.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A cruise control method to control a vehicle, comprising:
   receiving, by a controller of the vehicle, a set speed, a maximum allowed speed, and a minimum allowed speed, wherein each of the maximum allowed speed and the minimum allowed speed is a speed boundary of an allowed speed range;
   commanding, by the controller, a propulsion system to produce a commanded axle torque to maintain the set speed;
   monitoring a current speed of the vehicle;
   monitoring an elevation of a terrain at predetermined-upcoming locations of the vehicle based on upcoming elevation data;
   generating an elevation look-ahead table using the elevation of the terrain at the predetermined-upcoming locations of the vehicle, wherein the elevation look-ahead table includes a plurality of look-ahead elevation points;

determining projected speeds of the vehicle at each of the predetermined-upcoming locations of the vehicle as a function of the current speed of the vehicle and the elevation of the terrain at the predetermined-upcoming locations of the vehicle;

generating a projected-speed table using the projected speeds of the vehicle at each of the predetermined-upcoming locations of the vehicle;

comparing each of the projected speeds of the vehicle at each of the predetermined-upcoming locations with the allowed speed range;

determining whether at least one of the projected speeds is outside the allowed speed range; and in response to determining that the at least one of the projected speeds is outside the allowed speed range, commanding, by the controller, the propulsion system of the vehicle to adjust the commanded axle torque in order to maintain an actual speed of the vehicle within the allowed speed range at each of the predetermined-upcoming locations.

2. The cruise control method of claim 1, further comprising identifying a first speed point in the projected-speed table that is less than the minimum allowed speed.

3. The cruise control method of claim 2, further comprising finding a first local minimum in the projected-speed table.

4. The cruise control method of claim 3, further comprising determining a distance from a current location of the vehicle to a location at the first local minimum, wherein the distance from the current location of the vehicle to the location at the first local minimum is a peak distance.

5. The cruise control method of claim 4, further comprising setting a desired speed at the peak distance to be the minimum allowed speed.

6. The cruise control method of claim 5, further comprising computing a scaled projected speed table as a function of the minimum allowed speed and the first local minimum.

7. The cruise control method of claim 6, further comprising computing a required work input to achieve the minimum allowed speed at the peak distance as a function of a mass of the vehicle and the minimum allowed speed.

8. The cruise control method of claim 7, further comprising calculating an adjusted torque required to achieve the minimum allowed speed at the peak distance as a function of the required work input.

9. The cruise control method of claim 8, further comprising re-computing the projected speed table as a function of the adjusted torque required to achieve the minimum allowed speed at the peak distance.

10. The cruise control method of claim 9, further comprising commanding the propulsion system to produce an updated-commanded axle torque, wherein the updated-commanded axle torque is equal to the adjusted torque required to achieve the minimum allowed speed at the peak distance plus the commanded axle torque.

11. The cruise control method of claim 1, further comprising identifying a first speed point in the projected-speed table that is greater than the maximum allowed speed.

12. The cruise control method of claim 11, further comprising finding a first local maximum in the projected-speed table.

13. The cruise control method of claim 12, further comprising determining a distance from a current location of the vehicle to a location at the first local maximum, wherein the distance from the current location of the vehicle to the location at the first local maximum is a peak distance.

14. The cruise control method of claim 13, further comprising setting a desired speed at the peak distance to be the maximum allowed speed.

15. The cruise control method of claim 14, further comprising computing a scaled projected speed table as a function of the maximum allowed speed and the first local maximum.

16. A vehicle system, comprising:
a propulsion system;
a controller in communication with the propulsion system, wherein the controller is programmed to:
receive a set speed, a maximum allowed speed, and a minimum allowed speed, wherein each of the maximum allowed speed and the minimum allowed speed is a speed boundary of an allowed speed range;
command a propulsion system to produce a commanded axle torque to maintain the set speed;
monitor a current speed of the vehicle;
monitor an elevation of a terrain at predetermined-upcoming locations of the vehicle based on upcoming elevation data;
generate an elevation look-ahead table using the elevation of the terrain at the predetermined-upcoming locations of the vehicle, wherein the elevation look-ahead table includes a plurality of look-ahead elevation points;
determine projected speeds of the vehicle at each of the predetermined-upcoming locations of the vehicle as a function of the current speed of the vehicle and the elevation of the terrain at the predetermined-upcoming locations of the vehicle;
generate a projected-speed table using the projected speeds of the vehicle at each of the predetermined-upcoming locations of the vehicle;
compare each of the projected speeds of the vehicle at each of the predetermined-upcoming locations with the allowed speed range;
determine whether at least one of the projected speeds is outside the allowed speed range; and
in response to determining that the at least one of the projected speeds is outside the allowed speed range, command the propulsion system of the vehicle to adjust the commanded axle torque in order to maintain an actual speed of the vehicle within the allowed speed range at each of the predetermined-upcoming locations.

17. The vehicle system of claim 16, wherein the controller is programmed to identify a first speed point in the projected-speed table that is less than the minimum allowed speed.

18. The vehicle system of claim 17, wherein the controller is programmed to find a projected minimum speed.

19. The vehicle system of claim 18, wherein the controller is programmed to determine a distance from a current location of the vehicle to a location at the projected minimum speed, and the distance from the current location of the vehicle to the location at the projected minimum speed is a peak distance.

20. The vehicle system of claim 19, wherein the controller is programmed to set a desired speed at the peak distance to be the minimum allowed speed.

* * * * *